Nov. 1, 1960　　　　　M. WAHLI　　　　2,958,241
CUTTING TOOL

Filed Feb. 20, 1958　　　　　　　2 Sheets-Sheet 1

INVENTOR.
Marcel Wahli
BY
Richards Geier
ATTORNEYS

Nov. 1, 1960    M. WAHLI    2,958,241
CUTTING TOOL

Filed Feb. 20, 1958    2 Sheets-Sheet 2

INVENTOR.
Marcel Wahli
BY Richards & Geier
ATTORNEYS

United States Patent Office 2,958,241
Patented Nov. 1, 1960

2,958,241

CUTTING TOOL

Marcel Wahli, 51 Riedenhaldenstrasse,
Zurich, Switzerland

Filed Feb. 20, 1958, Ser. No. 716,446

2 Claims. (Cl. 77—73.5)

The present invention relates to cutting tools and more particularly to a cutting tool of the type used to countersink bores and the like.

The primary object of the present invention is to facilitate the variation of the cutting characteristics of a cutting tool.

A further object of the present invention is the provision of a cutting tool having adjustable cutting edges.

Still another object of the present invention is the provision of a cutting tool facilitating the reconditioning or replacement of the cutting edges thereof.

These and other objects of the present invention will become more apparent from the following detailed description, reference being made to the accompanying drawing showing several embodiments of the present invention.

Figure 1:
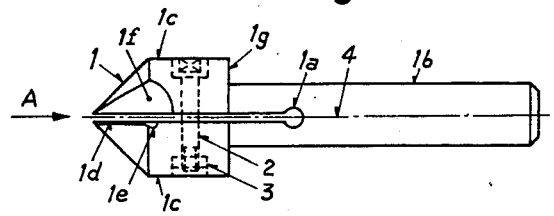
Fig. 1 is an elevation of a countersink cutting tool.
Figure 2:
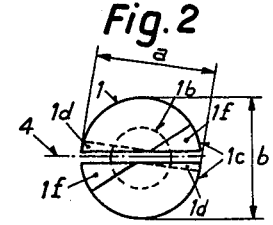
Fig. 2 is a view in the direction A of Fig. 1.

According to Figs. 1, 2, 3 and 4, the countersink consists of the fork-shaped conical guide head 1 with the two resilient arms 1c converging in the bore 1a of the shank 1b, the cutting edges 1d with the backing-off clearance 1e, the recesses 1f for the discharge of the chips, the cylindrical part 1g and also the adjusting screw 2 with the locking nut 3.

By means of the screw 2, the two resilient arms 1c can be so adjusted relatively to one another that the diameter $a$ (Figs. 2, 3 and 4) measured between points on the cutting edges 1d, is equal to, or is larger than, or is smaller than, the diameter $b$.

If the cone of the guide head 1 is cut by a plane at right-angles to the axis 4 (Figs. 1 and 2) of the countersink, then for the case in which $a=b$ (Fig. 2), the cutter points 1d disposed in the sectional plane lie on the same circle as the cone points which are also in the said plane.

In the second case, in which $a$ is larger than $b$ (Fig. 3), the cutter points are now disposed on the circumscribed circle 5, while all other points of the cone are disposed within said circle. In this case, contrary to the first example, the tangents to the circumscribed circle and to the countersink cone, at the points where the cutter points and the circumscribed circle 5 meet, form an angle $\alpha$ which is different from zero, this being he so-called clearance angle. Finally, in the third case, in which $a$ is smaller than $b$ (Fig. 4), the cutter points are within the circumscribed circle.

The operation of this countersink is as follows:

If the two arms 1c are adjusted by means of the screw 2 and the locking nut 3 so that $a=b$ (Fig. 2), the cone produced by the countersink is identical with the cone of the guide head. The clearance angle $\alpha$ (Fig. 3) is zero in this case and the countersink operates with high friction and a low cutting ability.

Figure 3:
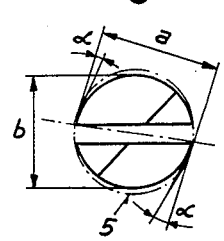
Figs. 3 and 4 are diagrammatic views showing different functional phases of the countersink according to Figs. 1 and 2.
Figure 4:
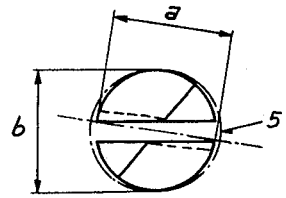

If the two arms are adjusted according to Fig. 3, the clearance angle is different from zero. The friction between the countersink and the workpiece is substantially lower and the cutting ability considerably higher.

Finally, in the third case, (Fig. 4) the cutter edges do not engage at all, because they are within the circumscribed circle and therefore the cutting ability is zero. The invention as illustrated in Figs. 1 to 4 therefore permits the cutting ability of the countersink to be varied from zero up to a certain maximum value, in that it permits the clearance angle to be varied by adjusting the arms serving as the cutters.

This offers the advantage that the countersink can be used for machining different materials such as wood, brass, steel etc.

Figure 5:
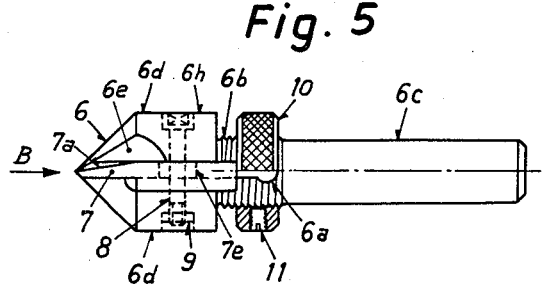
Fig. 5 is an elevation of a second form of construction of the cutting tool.
Figure 6:
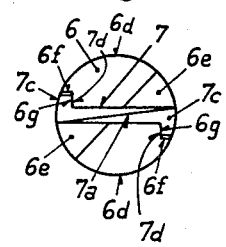
Fig. 6 is a view in the direction B of Fig. 5.
Figure 7:
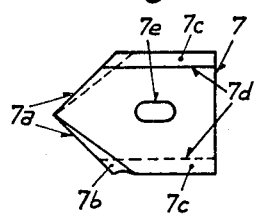
Fig. 7 is a plan view of the blade insert of Figs. 5 and 6.

According to Figs. 5, 6 and 7 the second embodiment consists of the fork-shaped conical guide head 6 with the two resilient arms 6d converging in the bore 6a of the stem 6c having a thread 6b, the recesses 6e for the discharge of the chips and the recesses 6f with the guide surfaces 6g and disposed parallel to the axis of rotation of the countersink, the cylindrical part 6h, the blade 7 clamped between the two arms 6d and having the cutting edges 7a disposed on a cone congruent with the guide head cone, the backing-off clearance 7b, the guide strips 7c which engage in the recesses 6f and have the guide surfaces 7d bearing without any play on the guide surfaces 6g, the slot 7e, the fixing screw 8 with the locking nut 9 and the adjusting nut 10 with the locking screw 11.

The cutter 7, which is adapted to be clamped by means of the fixing screw 8 between the two arms 6d and is displaceable parallel to the countersink axis, is so adjustable in the direction of the said axis by slackening the fixing screw 8 and adjusting the adjusting nut 10 so that its cutting edges are either located on the cone of the guide head or project somewhat beyond the said cone. In the first case a zero cutting angle is obtained, while in the second case the cutting angle differs from zero. The invention as illustrated in Figs. 5, 6 and 7 thus permits the cutting ability of the countersink to be varied from zero up to any desired maximum value, so that the countersink may be used for machining different materials requiring different cutting angles.

After the adjustment of the blade to the required cutting ability, the fixing screw 8, its locking nut 9 and the locking screw 11 of the adjusting nut 10 are tightened, whereby the countersink is ready for operation.

Figure 8:
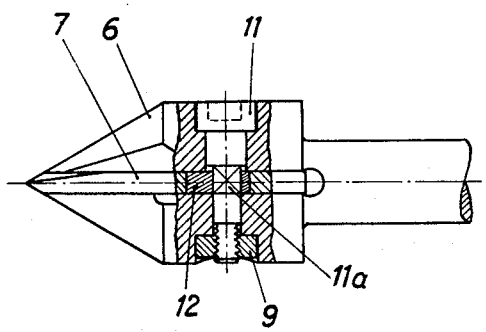
Figs. 8 and 9 show another form of construction of the cutting tool.
Figure 9:
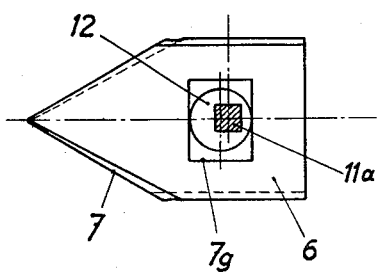

The embodiment illustrated in Figs. 8 and 9 differs from that of Figs. 5 to 7 mainly in that the blade 7 can be operated directly by turning a setting screw, which simultaneously acts as a clamping screw, and by means of which the blade 7 can be clamped directly between the arms 6d in the guide head.

In this embodiment, the guide head 6 contains a setting screw 11 which is provided in its middle portion with a square section 11a, which extends beyond the thickness of the blade 7. A disc 12 formed with an internal square aperture and having a cylindrical peripheral surface is fitted on to the square section 11a, the axis of said disc being eccentrically disposed relative to the axis of the guide screw.

The disc 12 is arranged in a rectangular recess 7g in the blade 7, the width of the recess corresponding to the diameter of the disc 12 and the length of the recess being greater than the width by twice the eccentricity of the disc. The adjusting screw is secured by a nut 9. As will be seen, after slackening the nut 9, it is possible to effect displacement of the blade 7 by turning the screw 11, this displacement being forwardly or rearwardly, depending on the direction in which the screw is turned.

The embodiment which has just been described, permits the cutting blade to be adjusted in a simple manner and also permits replacement of this blade by another having a different cutting angle.

The blade 7 can either consist entirely of cutting metal, or can be provided at the cutting edges with facings of cutting metal.

In conjunction with the form illustrated in Figs. 1 to 4, it is also possible to provide the cutting head 6 with more than two resilient arms and to vary the setting thereof by means of a nut which is screwed on to the rear end of the guide head, in which case both the nut and also the arms co-operating therewith would be provided with conical projections.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A cutting tool countersink, comprising a cylindrical shank, a guide head integral with said shank and having a cylindrical portion adjacent said shank and two resilient arms having outer conical surfaces, said countersink having formed therein a central slot separating said two arms and extending through said cylindrical portion and into said shank and a central bore formed in said shank and constituting the bottom of said slot, arms having diametrically opposed chip discharge recesses formed therein, said cylindrical portion having a central bore formed therein and extending perpendicularly to said slot, and having enlarged recesses at opposite ends thereof, a single adjusting screw located in the last-mentioned bore hole and having a head located in one of said recesses, and a locking nut carried by said screw and located in the other one of said recesses; a blade located in said slot and having an opening formed therein, said screw extending through said opening, said blade having cutting edges located upon a cone which is congruent with said outer conical surfaces of the resilient arms, said blade further having diametrically opposed backing off clearances formed therein, and diametrically opposed guide strips engaging recesses formed in said arms; said shank having outer screw threads adjacent said cylindrical portion, an adjusting nut threaded upon said screw threads, and a locking screw carried by said adjusting nut.

2. A cutting tool countersink, comprising a cylindrical shank, a guide head integral with said shank and having a cylindrical portion adjacent said shank and two resilient arms having outer conical surfaces, said countersink having formed therein a central slot separating said two arms and extending through said cylindrical portion and into said shank and a central bore formed in said shank and constituting the bottom of said slot, said arms having diametrically opposed chip discharge recesses formed therein, said cylindrical portion having a central bore formed therein and extending perpendicularly to said slot, and having enlarged recesses at opposite ends thereof, a single adjusting screw located in the last-mentioned bore hole and having a head located in one of said recesses, and a locking nut carried by said screw and located in the other one of said recesses, said screw having a square section intermediate its ends; a blade located in said slot and having a recess formed therein, a disc located in the last-mentioned recess, said disc having an eccentrical aperture containing said square section, said blade having cutting edges located upon a cone which is congruent with said outer conical surfaces of the resilient arms, said blade further having diametrically opposed backing off clearances formed therein, and diametrically opposed guide strips engaging recesses in said arms.

References Cited in the file of this patent
FOREIGN PATENTS

| | | |
|---|---|---|
| 107,220 | Great Britain | June 28, 1917 |
| 242,671 | Switzerland | Oct. 16, 1946 |

OTHER REFERENCES

Germany, B 25,430 (Kl. 49a, 60, 04), Sept. 22, 1955.